United States Patent Office 3,434,117
Patented Mar. 18, 1969

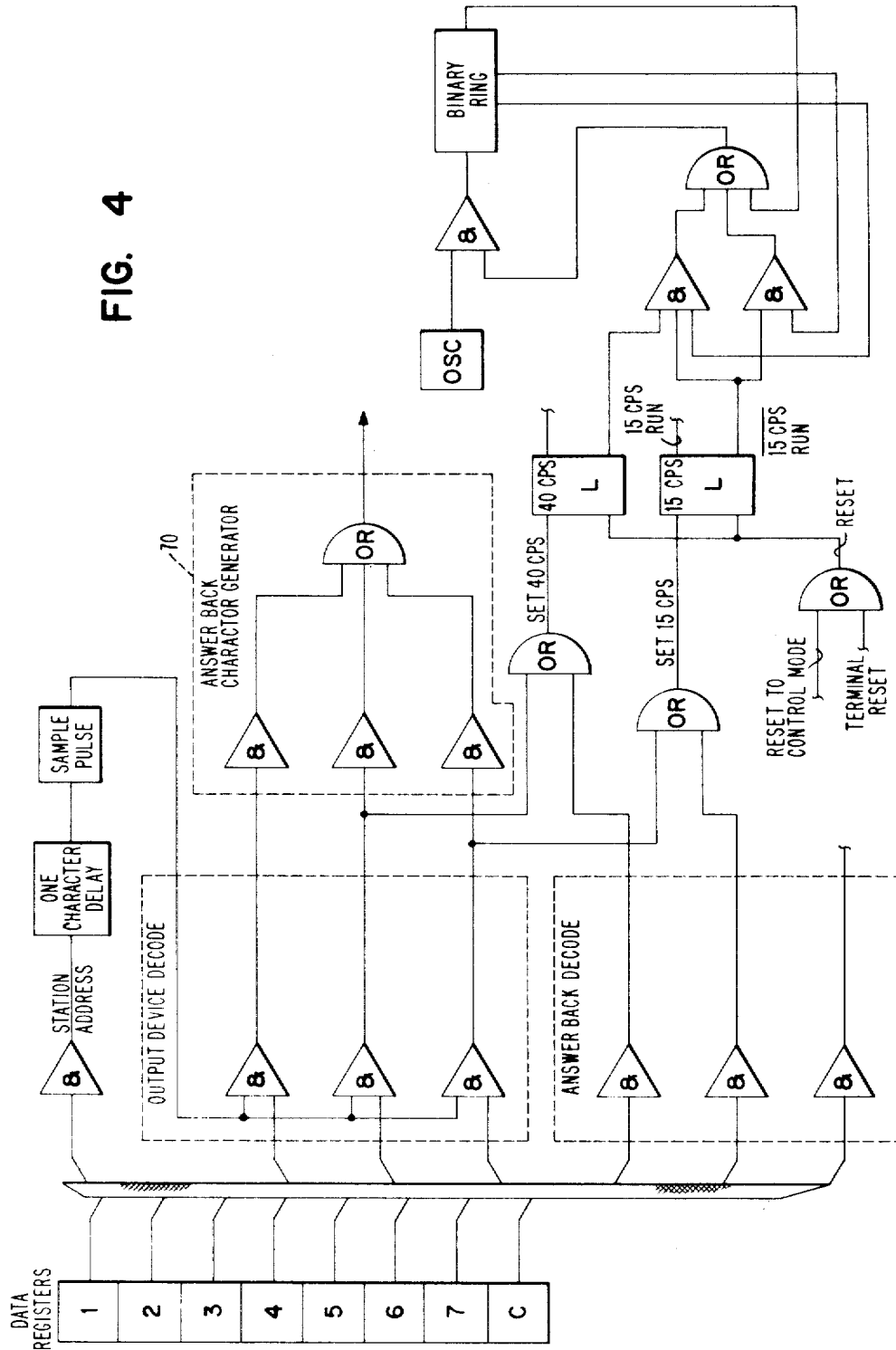

3,434,117
AUTOMATIC TRANSMISSION SPEED SELECTION CONTROL FOR A DATA TRANSMISSION SYSTEM
Robert G. Gibson, Binghamton, N.Y., David R. Hughes, Raleigh, N.C., and Richard L. Leavenworth, Friendsville, Pa., assignors to International Business Machines Corporation, Armonk, N.Y., a corporation of New York
Filed Apr. 24, 1967, Ser. No. 633,208
U.S. Cl. 340—172.5         7 Claims
Int. Cl. G11b 13/00

ABSTRACT OF THE DISCLOSURE

An automatic speed selection control for a data transmission system wherein the output devices have different speeds of operation and it is essential to regulate the speed of the transmitting terminal into conformity with the speed of the receiving or output device.

BACKGROUND OF THE INVENTION

A data transmission system can have a plurality of data terminals each having one or more input and/or output devices with different operating speeds, i.e. one hundred-twenty c.p.s. (characters per second), sixty c.p.s., forty c.p.s., or fifteen c.p.s. For satisfactory operation it is essential that the transmitting terminal operate with the same speed capability as the data receiving or output device. This invention is directed to the provision of apparatus for automatically adjusting the speed of the transmitting terminal to the operating speed of the receiving data output device.

Many message transmission systems exist in the prior art, some for transmitting point-to-point and others for transmitting from a point to multiple points. However, most of these systems are restricted to a single speed of transmission which is determined by the slowest speed of operation of all the receiving devices. Inventions in the prior art have been directed to devices for correcting synchronism in multi-channel installations; others have been directed to means for synchronizing the transmitting terminal with the receiving terminal; still others have been directed to the operation of synchronous multiplex systems and the means for inter-linking start-stop printer apparatus with one or more channels of the multiplex system; and others have been directed to start-stop systems of operation in a non-synchronous manner in which the operation of the transmitting equipment is no longer bound to be prescribed cadence of the synchronous system, but is adapted in a non-synchronous manner of operation such as that of a person using a typewriter as the input device. Usually, these systems involve output devices having a predetermined range of speeds of operation and the systems are necessarily restricted to the speed of operation of the slowest output device.

A wide variety of high-speed data processing equipment is currently being used and developed by numerous business corporations. Source data, which is generated at remote points, has to be communicated to a central point to enable the data processing operations; and processed data has to be communicated to remote terminals. The rapid rate of technological innovation and its improvement to the national economy and the operative success of corporations has put a premium on effective communications. It is essential in the present-day data processing art to allow all forms of electrical communications to take place over the same facilities with a high degree of economic efficiency.

To this end, the present invention is directed to an automatic means of selecting the transmission speed within a data transmission system with variously coupled output devices having different operational rates used.

SUMMARY OF THE INVENTION

Briefly, this invention is directed to the logical circuitry required to enable a data transmitting terminal to reduce its transmitting speed so as to match the operating speed of an output device or devices to which it is sending data. Also, a data transmitting terminal might be a computer-controlled transmission system. A data transmission system may comprise a central terminal and one or more remotely located terminals with each terminal station capable of having one or more input and output components with different characteristic speeds of operation. Normally, the data transmission system has a basic rate for transmitting the data characters, but to accommodate the slower operating output devices, it is necessary to reduce the transmission speed of the system. Accordingly, this invention provides circuit logic and controls for adjusting the speed for each individual message transmission or portion thereof. A data message to be transmitted is entered via an input device and placed in a storage register one character at a time and is then sampled to determine if the character is a control character or a data character. The first two characters of each message will constitute an address with the first character being used to identify the particular terminal to be rendered operative for receiving the message and the second character being used to address a particular output component within the receiving terminal. The operating characteristic of the output component determines the speed of transmission, and therefore, the second character when sensed serves to establish the operating speed of the transmitting terminal. The transmitting terminal and the receiving terminal remain selected and operative until an EOT (End of Transmission) or de-select squence occurs at the end of the message or at a component selection/de-selection change code within the message at which time the system is restored to its normal condition.

It is a primary object of the invention to provide an automatic speed selecting and control means for adjusting the data transmission rate within a data transmission system having components with different speed-operating characteristics.

It is a further object of the invention to provide a data transmission system with control means such as will enable the system to have a greater flexibility and accommodation for a variety of output devices with different operating speed characteristics.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 4 is a logic diagram of an alternative embodiment of the automatic speed selection control apparatus in accordance with the instant invention.

DESCRIPTION OF THE PREFERRED EMBODIMENTS

Figure 1:
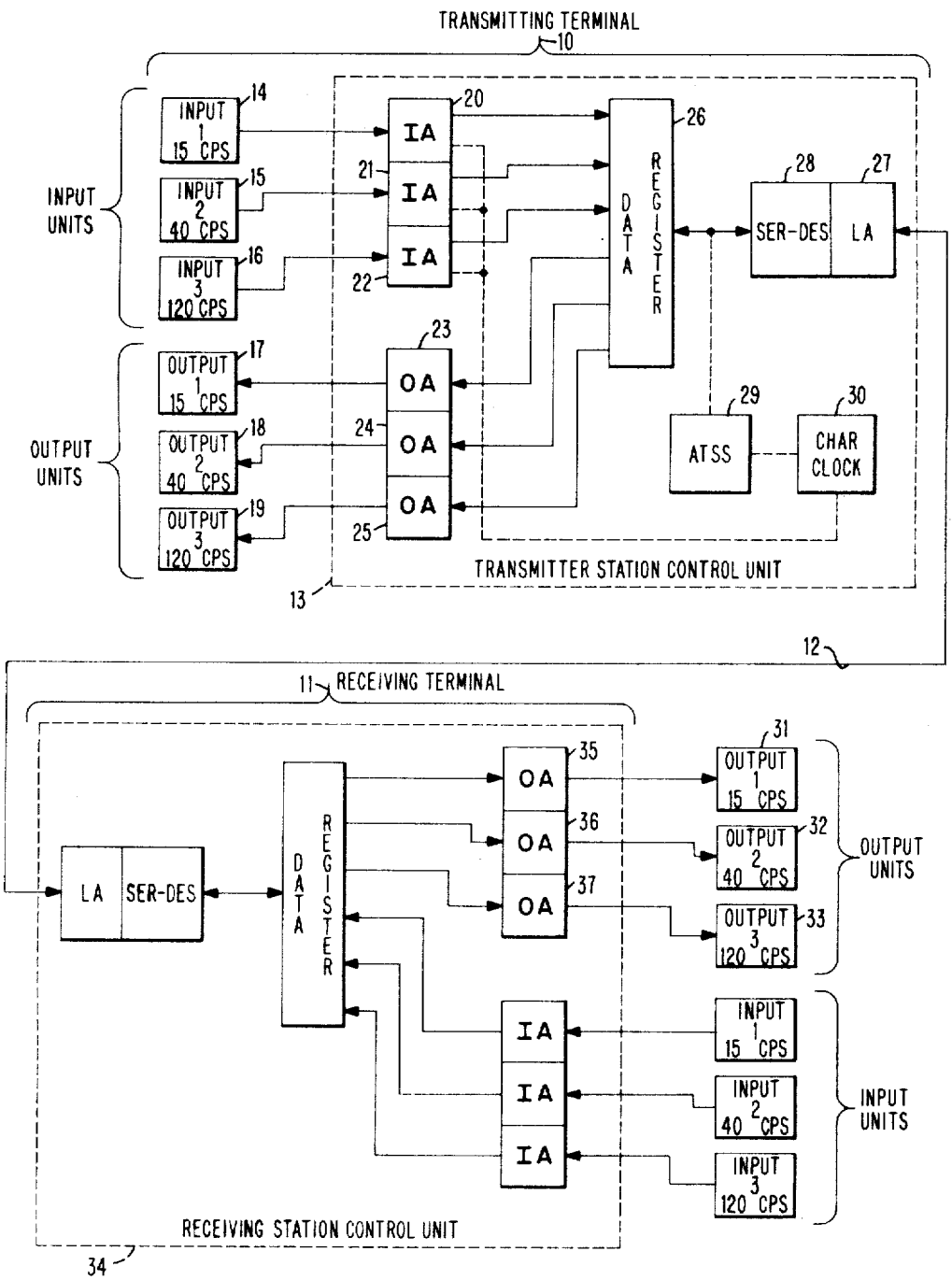
FIG. 1 is a schematic block diagram of a data transmission system incorporating the instant invention.

A preferred embodiment of the invention is incorporated in a data transmission system, FIG. 1, where it is desirable to communicate between input/output devices that have different inherent character-transmission rates. Referring to FIG. 1, there is shown two communication terminals, a data transmitting terminal 10 and a data receiving terminal 11, which communicate with each other via the communications channel 12. The data transmitting terminal 10 includes a control unit 13 which houses the necessary control logic to attach the various input devices 14, 15 and 16 and the output devices 17, 18 and 19 with the communication channel 12. Control unit 13 provides controls for the orderly exchange of information between the two terminals 10 and 11.

The control unit 13 contains attachment points identified as the input adapters 20, 21 and 22 for the input devices 14, 15 and 16, respectively. The input units may comprise keyboards, card readers, or paper tape readers and the like. The control unit 13 also includes the output adapters 23, 24 and 25 which function as attachment points for the output devices 17, 18 and 19, respectively. The output devices may comprise printers, card punches, or paper tape punches and the like. It is significant to note that in accordance with the preferred embodiments herein described, the operation is half-duplex, i.e. transmission in either direction but not both directions simultaneously, but the system is capable of full-duplex operation, i.e. simultaneous data transmission in both directions. It may be further noted that both terminals 10 and 11 can attach both input and output devices. The control unit 13 further includes a data register 26 for temporarily storing data characters. Also included in the control unit 13 is a line amplifier 27 and a Serdes unit (serializer-deserializer) 28 which functions as the name implies to serialize or deserialize the data for application to the transmission line 12 or receiving data from the transmission line 12, respectively.

To maintain a high level of throughput on the communication channel 12, it is desirable to transmit at the highest character rate acceptable to the channel. We may define this character rate as the basic operating speed of the system. However, when it is necessary to transmit to devices which operate at a lower speed than the basic speed, it is necessary to incorporate control apparatus such as the automatic transmission speed selector 29 and the character clock 30 which form the gist of the instant invention.

The system as hypothesized has a basic operating speed of one hundred-twenty characters per second (c.p.s.) and is capable of including output printers that operate at fifteen and/or forty c.p.s. It is important to note that the speeds mentioned are merely representative and that other speed devices can be equally as well adapted for use in the system. For instance, it is entirely possible to have a sixty c.p.s. paper tape punch as an output device. The only requirement to add an additional speed is to assign additional control codes for the selecting and de-selecting functions necessitated by the use of additional speeds which will become more apparent as the description proceeds.

Since the two terminals 10 and 11 are connected by a communication channel 12, one method for a terminal to control another is through the use of control codes definable as part of the transmission code. A significant advantage of the instant invention is that the speed selection can all be effected from the transmitting terminal 10 without any feedback required from the receiver terminal 11. In a system using forty and fifteen c.p.s. output printers, it is necessary to shift the speed of a one hundred-twenty c.p.s. transmitting device down to match the speed of the selected receiving device. This is the basis of the operation of the instant invention.

METHOD OF SELECTING DEVICES

Speed changes are affected only when a receiving device is selected or de-selected. This action can be accomplished either during selection on a multi-point system or in text mode on either a multi-point or point-to-point system. Text mode is defined as occurring during the transmission of the text of the message.

A selection address that is transmitted to select a receiving terminal and a receiving component within the terminal is sent by the device desiring to transmit a message. The address consists of two characters; a graphic character representing the address of the selected station and a numeric character representing the address of the selected component at the receiving station. In the system being described, each output device 31, 32 or 33 connects to the control unit 34 via an output adapter 35, 36 or 37.

A selection address is assigned to each output channel for each character rate. An address, identified as a general address, is also assigned for the event when a transmitting station will accept any available output device. Since the transmitting station must send this two-character address to select a receiving terminal and device, the device address character can be used to determine if a change in speed is required. A device selected in this manner remains selected until an EOT (End of Transmission) character is sent by the transmitting station to de-select the receiving station or the device is de-selected in the following manner.

A transmitting station can cause a receiving device to be selected or de-selected when operating in text mode by sending an "escape" character followed by a data character. An "escape" character is a control character used to expand the number of control functions realizable in a fixed data code, e.g. an "escape" character followed by a graphic A could be used to de-select printer number one. Other "escape" sequences are used to select and de-select remaining receiving devices. When the transmitting station desires to select an output device, the data character following the "escape" character is the same as the device selection address character. Another data character is assigned for each output channel at each output speed to turn off a selected device. A device selected by this method remains selected until an EOT is received or a de-select sequence is received.

METHOD OF CHANGING CHARACTER SPEED ON THE LINE

The rate at which the bits which make up a character are placed on the line is called the "baud" rate. In other words, a baud is a unit of signaling speed in data transmission and the speed in bauds equals the number of bits per second. The number of bits per character then determines the character rate. In the particular system being disclosed, the baud rate is twelve hundred bits per second for twelve hundred baud and the number of bits per character is ten. Therefore, the base character rate for the fastest rate which a terminal can send is one hundred-twenty characters per second.

Start-stop transmission requires that each character be framed with a start bit which is exactly one bit long and a stop bit which is a minimum of one bit long. The stop bit can be any length greater than one bit time. The line is held in a stop-bit condition, otherwise referred to as a "mark" condition. Since this stop bit can be any length greater than a bit time, characters can be sent down a communication line at any rate or speed equal to or less than the base character rate. This logic then allows the terminal to transmit at speeds of fifteen c.p.s. and forty c.p.s. The speed changing is accomplished by holding the baud rate constant and changing the character rate to the desired character rate. While the start-stop method is herein explained, it should be noted that a synchronous operating transmission system will work equally as well.

The character rate under the base rate can be established in one of two ways depending on the rate desired. A clock which gives a pulse at the beginning of the character time can be used to define the start of the character and, therefore, establish the character rate. The clock would then be required for each character rate desired, including the base rate. Such a clock can take many different forms. For example, it can be an electronic clock such as an oscillator driving a binary ring with a different terminating point for each character rate as is used in the preferred embodiment. It could also be a mechanical clock, the signal coming from a cam in the input device.

Another method can be used to establish character rates if the lower rates can be multiplied by a whole number to equal the base rate. On this terminal, forty c.p.s. can be multiplied by three to obtain a one hundred-twenty c.p.s.; one hundred-fifty c.p.s. can be multiplied by eight and then drop the units position to get the one hundred-twenty c.p.s. However, fifteen c.p.s. cannot be multiplied by any whole number to obtain forty c.p.s. This kind of character rate determination causes the transmitting station to send a character on the line once every three character times. For the remaining two character times, the line is changed to a stop-bit level. This form of character rate clock is used on other types of multiplexors to send at the fifteen c.p.s. rate on sixty c.p.s. basic rate lines.

In a system with some limited buffering (at least a one character buffer), a time fill character such as "delete" or SYNCH (Synchronous), such as is now being used in the ASCII code system, can be sent during the character times that the character is not on the communications line. For example, sending "X Delete Delete Y Delete Delete" creates an effective forty c.p.s. character rate on a one hundred-twenty c.p.s. line since the delete characters are discarded by the receiver. The only difference between this system and the one previously described of deriving a character rate clock is that fill characters are sent instead of clamping the line in the stop-bit position. This method is not as extensively used because of the increased cost to provide the buffering.

OPERATION OF THE LOGIC

Figure 2:
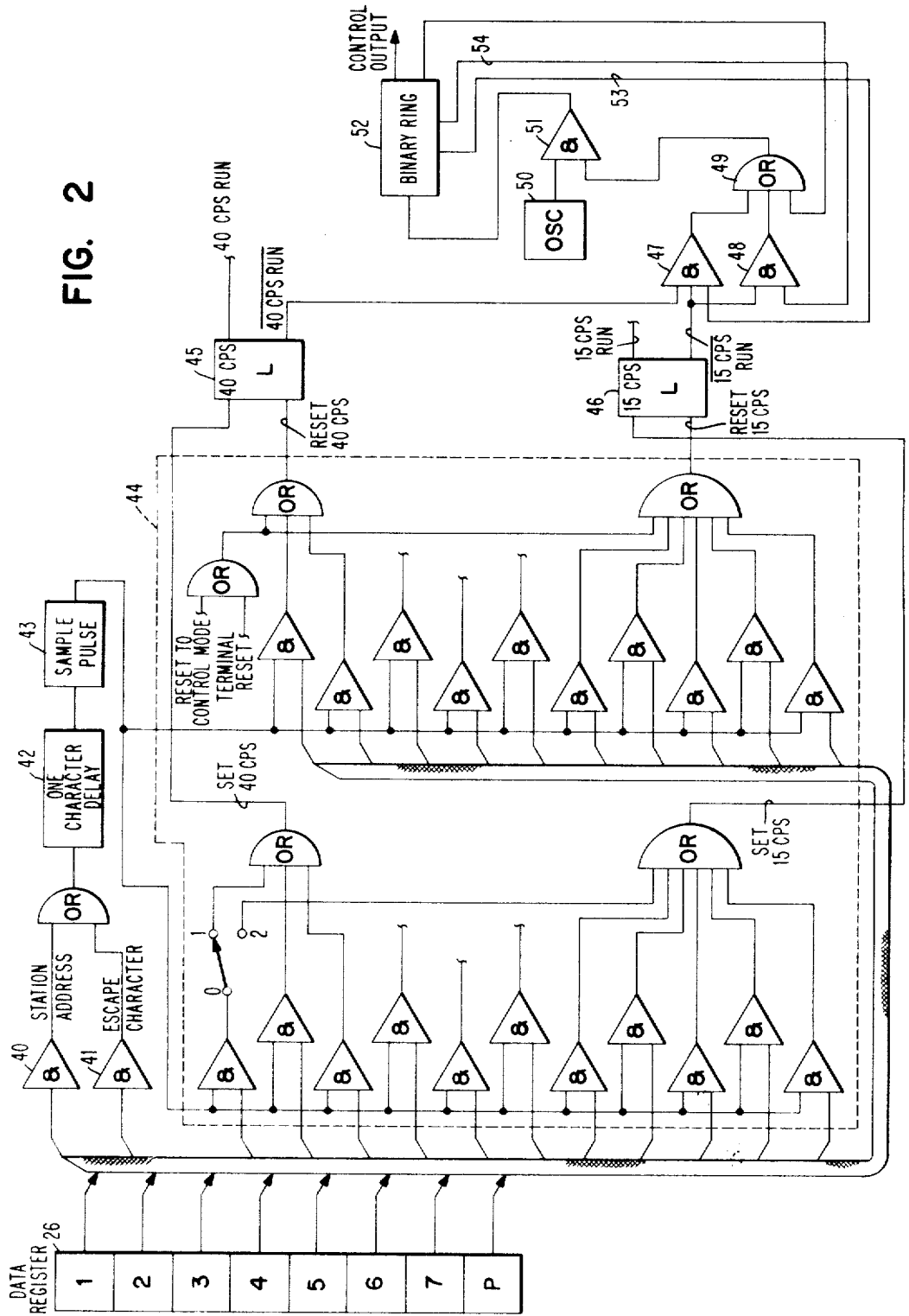
FIG. 2 is a logic diagram of the automatic transmission speed selection control apparatus of the instant invention.

Referring to FIG. 2, there is shown the block diagram of the logic for the automatic transmission speed selection and character clock. The logic comprises "and" and "or" logic circuitry, latch circuitry, an oscillator and binary ring logic. The logic "or" circuit is characterized by having two or more inputs and wherein an output signal is produced when an input signal is received on at least one of the input leads. A logic "and" circuit is characterized by having two or more inputs and wherein an output signal is produced when, and only when, input signals are received on all of the input leads in a concurrent fashion. A latch circuit comprises active elements, typically a transistorized configuration, capable of adapting to widely different states, conveniently designated the "off" state and the "on" state. Normally in the "off" state, it abides there until forceably driven by a signal of appropriate character into the "on" state. The latch will remain in its "on" state until reset. Electronic oscillators are well known in the art and function to provide a series of output pulses according to some predetermined rate.

Referring to FIG. 2, each character of a message to be transmitted is successively placed in the data register 26 and analyzed in the "and" circuits 40 and 41 to determine whether it is a station address character or an "escape" character. If either the station address or "escape" characters are detected, the character is stored in the one character delay 42 to enable the logic to examine the next succeeding data character. After the one character delay, a sample pulse is generated through the logic of block 43. The sample pulses feed the decode circuits 44, which are nothing more than a plurality of "and" circuits in combination with "or" circuits, and which function in response to the other outputs of the data register to decode the component select and de-select characters.

If the decode circuit 44 output is responsive to either a forty c.p.s. "escape" character or a fifteen c.p.s. "escape" character, then the forty c.p.s. latch 45 or the fifteen c.p.s. latch 46, respectively, will be operative. The forty c.p.s. latch 45 output or the fifteen c.p.s. latch 46 output functioning in combination with other inputs to the "and" switches 47 and 48 in combination with the "or" circuit 49 will in turn be applied to the "and" switch 51 for controlling the output from oscillator 50 as an input to the binary ring 52. The fifteen c.p.s. output from binary ring 52 serves as a feedback to "and" switch 47 while the forty c.p.s. output from binary ring 52 is applied as an output to the "and" switch 48.

As previously stated, the clock normally runs at the one-hundred-twenty c.p.s. rate; and in response to the proper "escape" characters, the operating rate of the character clock will be reduced to either the forty c.p.s. or fifteen c.p.s. rate, as appropriately determined through the use of the decode circuit 44. The control output from the binary ring 52 is coupled to the input amplifiers and output amplifiers of the transmitting terminal.

ALTERNATIVE EMBODIMENT

Figure 3:
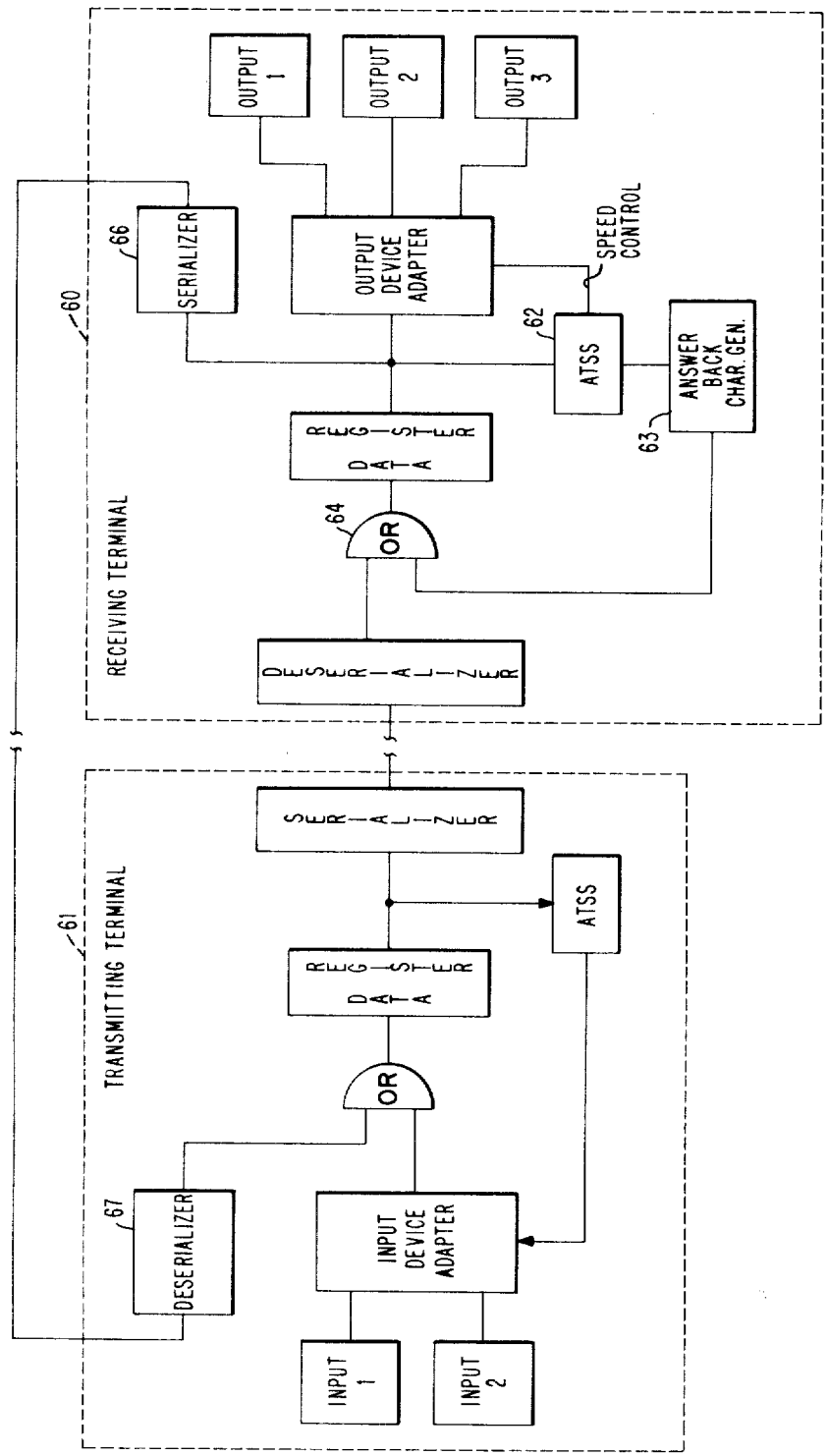
FIG. 3 is a schematic block diagram of a data transmission system incorporating an alternative embodiment of an automatic transmission speed selection control apparatus.

An alternate solution to the selection of an automatic speed transmission system which is a variation to the above-described preferred embodiment is illustrated in FIGS. 3 and 4. In this system, the speed of transmission is controlled by the receiving terminal 60 (address) by returning a unique address answerback character or characters to the transmitting terminal 61 (polling station) in response to an addressing cycle.

In relation to the previously described system, the basic speed (one hundred-twenty c.p.s.) could use an "ACK" (Acknowledge) character as the answerback response; a forty c.p.s. speed could use a (#) symbol; a fifteen c.p.s. could use a (*) symbol; etc., such that for every speed of output device, there would be an associated unique answerback character or characters. Thus, the answerback character from the receiving terminal 60 will indicate: (1) a terminal has been selected; (2) an output device is selected and ready; and (3) the speed at which the transmitting station must send the message.

In FIG. 3, the actual path of the automatic transmission speed selection starts at the ATSS box 62 in the receiving terminal 61 and follows via the answerback and character generator 63, the "or" switch 64, the data register 65, the serializer 66, and to the transmitting terminal 61 via the deserializer 67.

In FIG. 4, there is shown the alternative speed select logic; and it may be pointed out that each terminal that has a receiving device(s) also must have a unique character generator 70. The size of this generator is relative to the number of different speed output devices and whether a single or multiple characters are to be required for the answerback.

Each sending terminal must have a unique answerback character decode circuit with its size compatible with all of the various speeds it has to accommodate in communicating operations. The remaining logic of the alternate speed select logic is identical in its operation to that which was described for the preferred embodiment.

A preferred application for utilization of this speed arrangement is on a multi-point communications network, where a master station controls a plurality of slave stations. Each slave station has one output device, but these devices vary in speed from station to station. The master station contains all of the answerback character decodes and the capability of running at various speeds while each slave station runs at only a single speed. In addition, once a transmission speed has been selected, there is no necessity to change this speed during the transmission of the text information.

While the invention has been particularly shown and described with reference to preferred embodiments thereof, it will be understood by those skilled in the art that the foregoing and other changes in form and details may be made therein without departing from the spirit and scope of the invention.

We claim:
1. An automatic transmission speed selection control for a data transmission system comprising, in combination:
   (a) a data register adapted to consecutively receive and temporarily store the data representing signals of a message;
   (b) a character analyzing means coupled with said data register and responsive to a first control character temporarily stored therein;
   (c) a character decode means coupled with said data register and said character analyzing means and responsive to any control characters stored therein;
   (d) a clock which functions to control the transmission rate of the transmitting system; and
   (e) clock speed control means responsive to said character decode means and coupled with said clock and operative to select the operating speed of said clock to thereby effectively control the transmission rate of data messages.

2. An automatic transmission speed selection control for a data transmission system as defined in claim 1, further including
   (a) control character generation means responsive to the character decode means for generating equipment identifying control characters for transmission to a receiving terminal for selectively rendering output devices thereat operative.

3. An automatic transmission speed selection control for a data transmission system as defined in claim 2, further including
   (a) a second character analyzing means coupled with said data register and responsive to a second control character temporarily stored therein;
   (b) a one character delay storage means coupled with and responsive to both of said character analyzing means and operative to provide a control input to the character decode means.

4. An automatic transmission speed selection control for a data transmission system as defined in claim 3, further including
   (a) a sample pulse generating means operating in conjunction with the one character delay storage means.

5. An automatic transmission speed selection control for a data transmission system as defined in claim 4, further including
   (a) a reset control in said character decode means responsive to a de-select control character in the data register for restoring the lock to its normal operating condition.

6. An automatic transmission speed selection control for a data transmission system as defined in claim 1, further including
   (a) a second character analyzing means coupled with said data register and responsive to a second control character temporarily stored therein;
   (b) a one character delay storage means coupled with and responsive to both of said character analyzing means and operative to provide a control input to the character decode means.

7. An automatic transmission speed selection control for a data transmission system as defined in claim 6, further including
   (a) a reset control in said character decode means responsive to a de-select control character in the data register for restoring the clock to its normal operating condition.

References Cited
UNITED STATES PATENTS

| | | |
|---|---|---|
| 3,378,820 | 4/1968 | Smith. |
| 3,359,543 | 12/1967 | Corr et al. |
| 3,345,614 | 10/1967 | Neel. |
| 3,307,152 | 2/1967 | Robbins. |
| 3,281,527 | 10/1966 | Davis et al. |
| 3,139,607 | 6/1964 | Grondin. |
| 2,956,126 | 10/1960 | Jipp. |
| 2,934,604 | 4/1960 | Bizet. |
| 2,006,582 | 7/1935 | Callahan et al. |

GARETH D. SHAW, *Primary Examiner.*